United States Patent [19]
Alverson et al.

[11] 3,823,533
[45] July 16, 1974

[54] AIR FILTER RETAINER
[75] Inventors: Robert L. Alverson, Indianapolis; Howard W. Morris, Zionsville, both of Ind.
[73] Assignee: Carrier Corporation, Syracuse, N.Y.
[22] Filed: Sept. 27, 1973
[21] Appl. No.: 401,517

[52] U.S. Cl............ 55/493, 55/481, 55/501, 55/504, 55/509
[51] Int. Cl............................................. B01d 27/08
[58] Field of Search........... 55/481, 493, 496, 501, 55/504, 507, 508, 509, 511; 160/371, 327; 126/110 R, 110 B

[56] References Cited
UNITED STATES PATENTS
| | | | |
|---|---|---|---|
| 3,150,945 | 9/1964 | Baggeson | 55/493 |
| 3,156,233 | 11/1964 | O'Connell | 126/110 R |
| 3,203,157 | 8/1965 | Watlington | 55/495 |

Primary Examiner—Bernard Nozick
Attorney, Agent, or Firm—J. Raymond Curtin; Donald F. Daley

[57] ABSTRACT

A retaining bracket for use in holding filter material in a furnace or the like having a U-shaped rod biased into a pair of L-shaped openings in brackets spanning the filter.

3 Claims, 3 Drawing Figures

PATENTED JUL 16 1974 3,823,533

AIR FILTER RETAINER

BACKGROUND OF THE INVENTION

This invention relates to air handling equipment and particularly to a retainer to hold filter material in a fluid stream.

Air handling equipment such as forced air furnaces and air conditioning equipment utilizes various types of air filtering material. This filter material is usually in the form of a sheet or pad which intersects the air path so that movement of the air through the filter will tend to remove dust or particulate material in the air. The filter material is usually constructed of a loose, fibrous material which requires some external support means to provide sufficient rigidity to sustain its own weight and to resist the force of the air or other fluid material passing through the filter. Normally a metal, plastic or paperboard material is used to form a frame encasing the filter and a pair of face sheets having sufficiently large openings on each face to permit passage of air through the filter. In addition, the filter is normally mounted in the air conduit or in the housing of the heating unit or air conditioning unit, in position to intercept air being moved through the unit. Some structural support is required to hold the filter in place against the movement of the air and at the same time allow removal and replacement of the filter.

Various types of rigid frames have been provided into which the filter can be slidably positioned to secure the filter in place. These types of filter retaining devices are ineffective with a filter that does not have a rigid, self-sustaining structure encasing the filter.

The present invention provides a clamping and structural support device for filter material which can be quickly opened and closed to facilitate removal and replacement of a filter and to provide a degree of rigidity against the action of air flowing through the filter. The retainer or clamping device is self-locking to prevent inadvertent release of the filter material through jarring or vibration. The retainer is removable, if necessary, and at the same time is permanently installed so that it does not have to be removed to change or remove the filter material.

SUMMARY OF THE INVENTION

It is therefore an object of this invention to retain an air filter medium in a housing.

It is a further object of this invention to provide a simple retaining means which will provide structural support for a filter medium and retain the medium in a moving air path.

It is a further object of this invention to provide a simple, easy to operate retainer which will support a filter in a fluid stream and which will allow easy removal and replacement of the filter.

These and other objects of this invention are obtained by means of a U-shaped rod constructed of a material so that the legs of the U are deflectable and sufficiently resilient to return to their original position. Two brackets each containing two L-shaped openings are positioned within the housing or conduit to receive and position the filter sheet or pad so that it intersects the fluid stream. The U-shaped rod is mounted in the L-shaped openings in each bracket. The bottom portion of the L-shaped openings in one bracket is sized to receive the closed end of the U-shaped rod and allow some degree of rotational movement of the U-shaped rod. The L-shaped openings in the other bracket are adapted to receive the legs of the U-shaped rod when they are deflected inward so that when the legs are moved to the bottom of the L and released, they return to their original position in the bottom of the L-shaped openings thereby retaining the U-shaped rod in a locked position.

BRIEF DESCRIPTION OF THE DRAWINGS

For a better understanding of the invention as well as other objects and further features thereof, reference is had to the following detailed description of the invention to be read in connection with the accompanying drawings, wherein.

DESCRIPTION OF THE ILLUSTRATED EMBODIMENT

Figure 1:
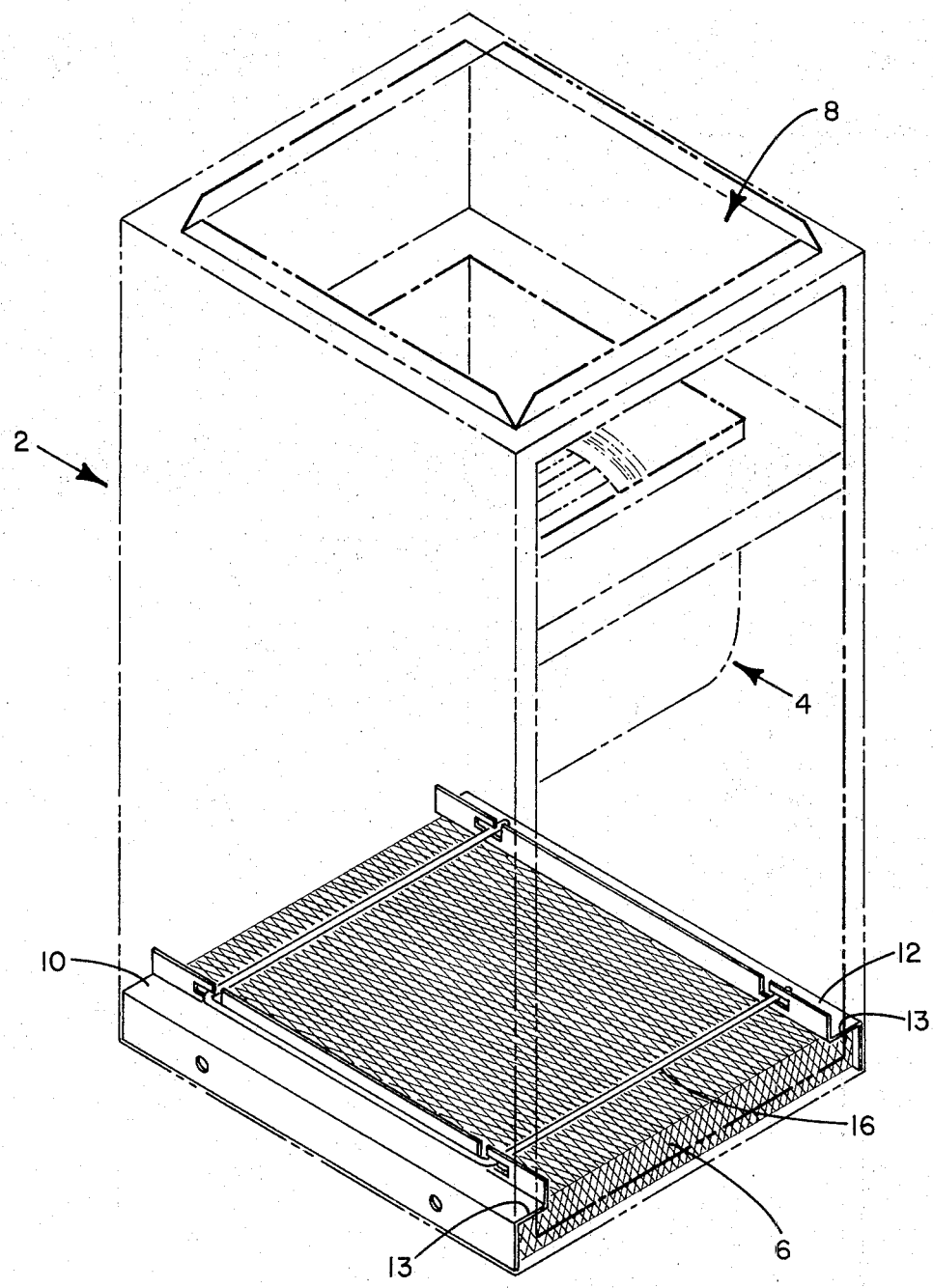
FIG. 1 is an isometric view of a forced air furnace with the present invention mounted therein.
Figure 2:
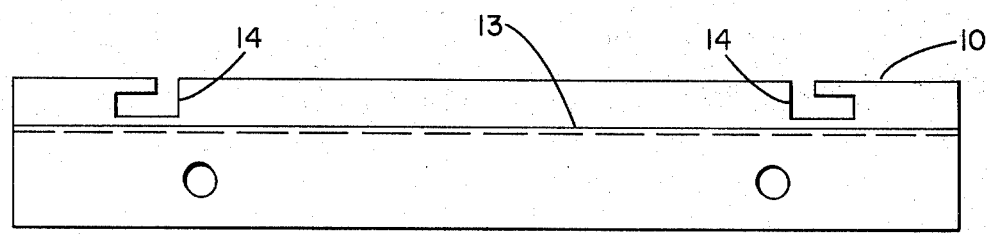
FIG. 2 is a detailed view of a bracket used in the present invention.

Referring to FIG. 1 of the drawings, there is shown a forced air furnace having a housing generally designated 2. Within the housing there is mounted a forced air fan 4 which is designed to move air through the furnace and the conduits of the heating system. The present invention is shown in the environment of a forced air heater for illustration purposes. It is equally useful in any environment where a fluid flow is forced through a filtering material. In the furnace shown, air is drawn into the heating structure through the bottom of the furnace 2 through a filter material generally indicated as 6 and forced out through the opening 8 in the top of the furnace by the fan 4. In the bottom of the furnace there are two brackets 10 and 12 mounted in parallel on opposite sides of the bottom opening of the furnace 2. These brackets could be mounted in a conduit through which the air to or from the furnace flows. Brackets 10 and 12 are secured to the structural frame of the furnace and span the air inlet opening. The brackets 10 and 12 are essentially the same and are shown in detail in FIG. 2.

Brackets 10 and 12 have a pair of L-shaped openings 14 extending downward and out toward the ends of the brackets. A U-shaped retaining rod 16 is mounted between the brackets 10 and 12 in the L-shaped openings 14.

Figure 3:
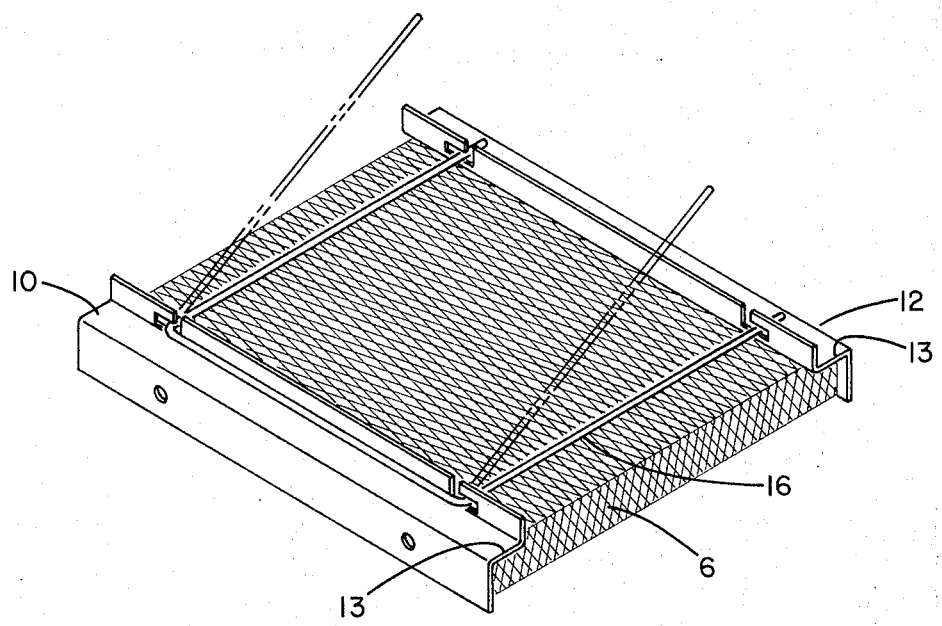
FIG. 3 is an isometric view of a filter pad, retaining rod and mounting brackets.

The bottom portion of the L-shaped openings 14 in the bracket 10 is sized to accommodate the closed end of the U-shaped rod 16 and to allow the rod to pivot from the solid position to the dotted line position as shown in FIG. 3. The vertical legs of the L-shaped openings 14 and both brackets 10 and 12 are sized to accommodate the rod 16 so that the rod 16 may be moved downward through the legs to the bottom portion of the L-shaped opening. To close the retaining rod, the two legs are deflected inward and moved downward from the dotted line position in FIG. 3 to the solid line position. The legs are then moved downward in the L-shaped openings 14 of the bracket 12 and released so that the legs return to the originally undeflected position in the bottom portion of the L-shaped opening. The retaining rod 16 is then locked in position and will not come out of the L-shaped openings until the two legs of the rod are again deflected inward and moved upwardly.

As shown herein, the brackets 10 and 12 are offset inwardly at 13 from the furnace housing 2 to provide a guide runner for the filter 6. This is one possible embodiment of the brackets 10 and 12, however it is not necessary that they be offset and provide a runner since the retaining rod 16 will hold the filter in place independent of the brackets 10 and 12. The filter is woven of fibrous material which provides cohesive internal strength, while the retaining rod 16 provides rigidity against movement due to the force of pressure of air against the surface of the filter. The particular shape of the brackets 10 and 12 shown in FIG. 3 is particularly desirable for this type of filter since there is no structural support around the edges of the filter material. The portion of the brackets 10 and 12 overlapping the filter material provides edge rigidity to prevent buckling or bending of the filter material around the positioning rod 16.

While the invention has been illustrated and described in certain embodiments, it is recognized that other variations and changes may be made therein without departing from the inventions as set forth in the claims.

We claim:

1. A filter retainer for use in holding and locking a sheet of filter material including
   a pair of brackets spaced apart in a position to secure a sheet of filter material,
   a pair of L-shaped openings in each bracket, extending from one edge of each bracket downward and then outward in opposite directions substantially parallel to the edge of the bracket,
   a U-shaped retaining rod extending between the brackets and having two legs each of which extend through one of the L-shaped openings in each bracket said legs being deflectable for insertion and removal from the L-shaped openings and sufficiently resilient to move apart into the bottom of the L-shaped openings to lock the retainer in place.

2. The filter retainer of claim 1 wherein the L-shaped openings in one bracket are sized to permit rotational movement of the U-shaped retaining rod for removal and replacement of the filter.

3. A filter retainer for use in holding and locking a sheet of filter material including
   a U-shaped rod having two deflectable legs,
   a first bracket having two slots therein which are sized to receive the legs of the U-shaped bracket and to permit rotational movement at the U-shaped bracket through a limited arc,
   a second bracket having two L-shaped slots, open at the top, to receive the legs of the U-shaped rod and lock the U-shaped rod into a filter retaining position,
   and means to mount the first and second bracket in a position to support a filter.

* * * * *